United States Patent
Wright

[15] 3,704,442
[45] Nov. 28, 1972

[54] HEIGHT SENSOR FOR HYDROFOIL WATERCRAFT

[72] Inventor: Charles P. Wright, Seattle, Wash.

[73] Assignee: The Boeing Company, Seattle, Wash.

[22] Filed: April 20, 1970

[21] Appl. No.: 30,049

[52] U.S. Cl..................340/1 L, 73/290 V, 340/3 R, 340/5 R
[51] Int. Cl..............................................G01s 9/68
[58] Field of Search........340/1 R, 1 L, 3 C, 3 R, 3 E, 340/5 R, 5 S; 73/290 V

[56] References Cited

UNITED STATES PATENTS 3,080,752   3/1963   Rich .......................73/290 V
2,960,678   11/1960  Beard et al................340/1 R Primary Examiner—Richard A. Farley
Attorney—Christensen, Sanborn & Matthews

[57] ABSTRACT

A method for detecting the relative position of a gaseous-liquid interface with respect to a datum point and an apparatus embodying the same for use in hydrofoil height sensors. A transmitter situated on the watercraft's hull directs an ultrasonic signal at the water surface. A portion of that signal is transmitted through the surface and refracted thereby to an ultrasonic receiver preferably situated on the hydrofoil. Evaluation of the transmission time of the ultrasonic signal from the transmitter to the receiver yields significant information concerning the relative position of the water surface with respect to either the hull or the hydrofoil. Factors for successful implementation of this technique are discussed in detail, and reference is made to a specific embodiment of a detector for transmission times.

9 Claims, 5 Drawing Figures

PATENTED NOV 28 1972 3,704,442

INVENTOR.
CHARLES P. WRIGHT
BY
Christensen Sanborn & Matthews
ATTORNEYS

INVENTOR.
CHARLES P. WRIGHT
BY
Christensen, Sanborn & Matthews
ATTORNEYS

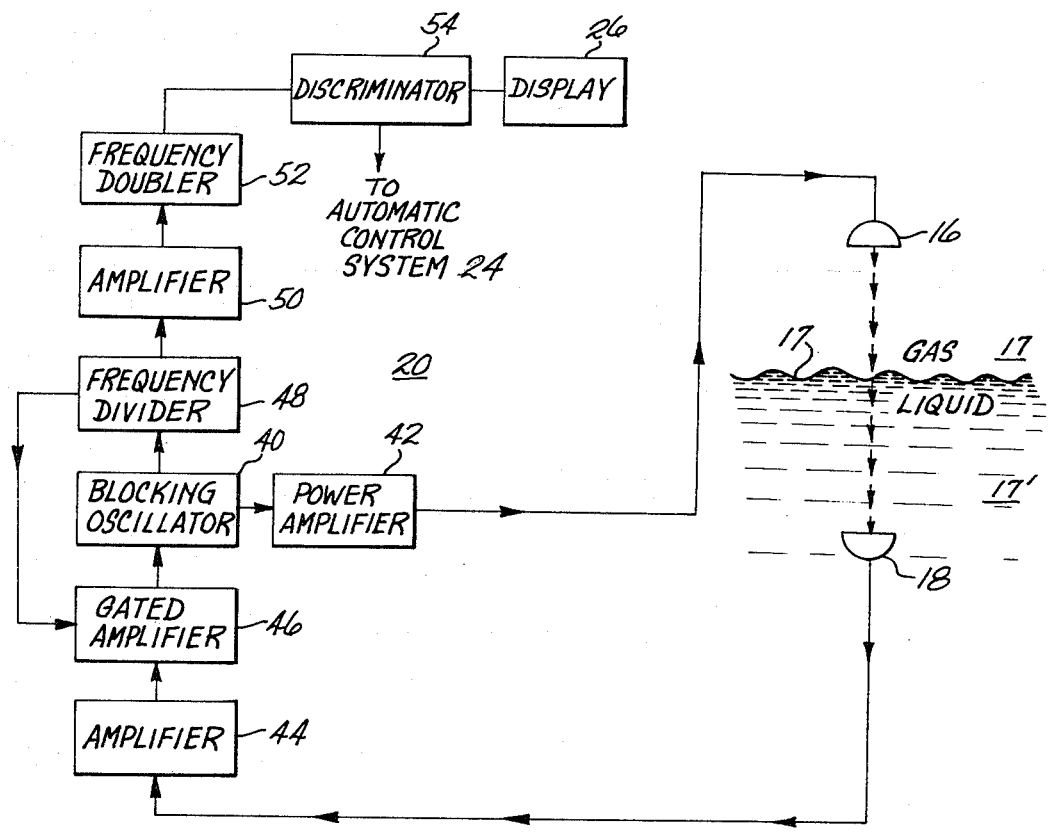

HEIGHT SENSOR FOR HYDROFOIL WATERCRAFT

BACKGROUND OF THE INVENTION

This invention relates in general to an apparatus and a method for sensing the position of an object relative to a gaseous-liquid interface, and, in particular, to an apparatus and a method for sensing the position of a submerged foil of a hydrofoil watercraft relative to the water surface.

There has been in recent years an increasing use of watercraft which are supported during travel by a foil which is in contact with the water. These foils generally comprise wing-like devices which produce a lifting force when propelled through the water and are divided into two types. The first is designed for use in relatively smooth waters and is partially submerged during travel. As is commonly known, watercraft using foils of this type begin travelling with the hull thereof in contact with the water. When the craft reaches a predetermined speed, the lift exerted on its foils is sufficient to raise the hull above the water. The depth of submergence of the foils is self-regulated and is determined by a balancing of the lift provided at the given propulsion speed against the weight of the watercraft.

Because of their self-regulated operation, these foils are not suitable for operation in the ocean or in other situations where extremely rough water is to be encountered. In such cases, a second type of foil is used which is totally submerged during any and all operating speeds. These foils truly act as underwater wings. The height of the watercraft, and thus the depth of submergence of the foil, is varied by changing the angle of attack of the foil with respect to the direction of watercraft travel.

Such watercraft invariably include automatic control systems for maintaining the depth of submergence of the foil at a predetermined value. This value must be maintained because it is desirable to maintain the lift of the foil relatively constant, and lift is greatly reduced if the foil ventures too close to the water surface. In addition, it is imperative that damage to the foil be avoided, such as might occur if the foil were to raise out of the water and thereafter to crash down thereupon. Finally, it is desirable to maintain the hull of the watercraft a certain distance above the peaks of the on-coming waves to avoid contact therebetween and potential damage to the hull.

To maintain depth of submergence at a predetermined value, it is necessary to know the actual depth of the foil at any instant of time. A number of sensors have been proposed and utilized to determine actual depth. In one of these, a plurality of electrical contacts are spaced vertically along a strut supporting the foil from the hull of the watercraft. Measurement of height is made by measuring the electrical resistance between the electrodes and a reference electrode which is always disposed within the water. If the water level changes with respect to the electrodes, the number of electrodes and thus the measured electrical resistance varies proportionally. In a similar device, a pair of rod electrodes are disposed on the strut. The dielectric between these electrodes comprises air and water, the relative proportions thereof depending on the depth of submergence of the foil. By measuring the capacitance of the electrodes by suitable means, this depth can be ascertained.

Although these devices give somewhat accurate readings of foil depth, they are not particularly useful in ocean-going or rough-water hydrofoil craft. Because the wave action in rough water is very complex, and often involves rapid changes in wave height, these devices, being mounted directly above the foil whose attitude is to be controlled, do not provide sufficient time for system response.

For rough-water hydrofoil watercrafts, it has been common to use a sensor which measures the height of the hull or the depth of the foil with respect to the water by conventional sonar techniques. In a first approach, an ultrasonic transmitter is disposed on the prow of the watercraft and directs its beam at the water surface. An ultrasonic receiver in proximity thereto receives a portion of the ultrasonic wave that is reflected from the water surface. If the velocity of the wave through the air medium is known, the height of the prow above the water surface can be determined by noting the transmission time of the wave from the transmitter to the water surface and back to the receiver. In a second approach, both the transmitter and receiver are disposed underwater and measure foil depth by the transmission time of the ultrasonic wave through the water medium. In both, a number of methods for detecting the transmission time are utilized, including pulsed and continuous wave signals.

By placing the transmitter and receiver on either the prow of the boat or the leading edge of the foil and appropriately directing the beam from the transmitter, the height of any in-coming wave may be measured in front of the watercraft and supplied to the automatic control system for the foils in sufficient time to anticipate a change in water level adjacent the foil.

However, these approaches using sonar techniques have not proved to provide reliable sensing. Since sonar requires that the wave be reflected from the water surface in order for a measurement of transmission time to be made, its reliability is dependent on the characteristics of that surface. Due to the complex wave action inherent in any rough water, a substantial portion of the ultrasonic wave directed at that surface by the ultrasonic transmitter is reflected in directions other than towards the ultrasonic receiver. In other words, a large portion of the transmitted wave is dispersed, and only a very small portion thereof is reflected back to the receiver.

It can be immediately perceived that if a continuous wave system is being utilized, very high power levels are required to insure continuous reception of the reflected wave. In such cases, the actual transmitting elements must be capable of handling these high power levels. Where a pulsed system is used, perhaps a less expensive and smaller transmitting element can be utilized. However, the dispersing characteristic of the surface dictates that some of the transmitted pulses will not be reflected back to the ultrasonic receiver. The result is an intermittent operation of the sensor with a resultant intermittent operation of the automatic control system.

Without reliable and continuous height or depth sensing in the open sea, for example, operation of the hydrofoil watercraft may become extremely dangerous.

It is therefore an object of this invention to provide an improved height or depth sensing technique for a hydrofoil watercraft.

It is another object of this invention to provide an improved height or depth sensor for a hydrofoil watercraft which provides reliable, continuous and accurate measurement of the position of the water surface relative to the watercraft.

It is a broader object of this invention to provide a method for sensing the position of a gaseous-liquid interface relative to a fixed datum.

SUMMARY OF THE INVENTION

These objects and others are achieved, briefly, by directing an ultrasonic signal from the watercraft through the air to the water surface, receiving underwater the portion of that signal that is refracted by passage through the water surface, and measuring the transmission time of the signal between the transmitter and receiver.

BRIEF DESCRIPTION OF THE DRAWINGS

The invention can perhaps be best understood, together with further objects and advantages thereof, by reference to the following portion of the specification taken in conjunction with the accompanying drawings in which:

FIG. 5 is a block diagram of a typical transmission time detector usable with the apparatus and method of this invention.

DESCRIPTION OF A PREFERRED EMBODIMENT

Figure 1:
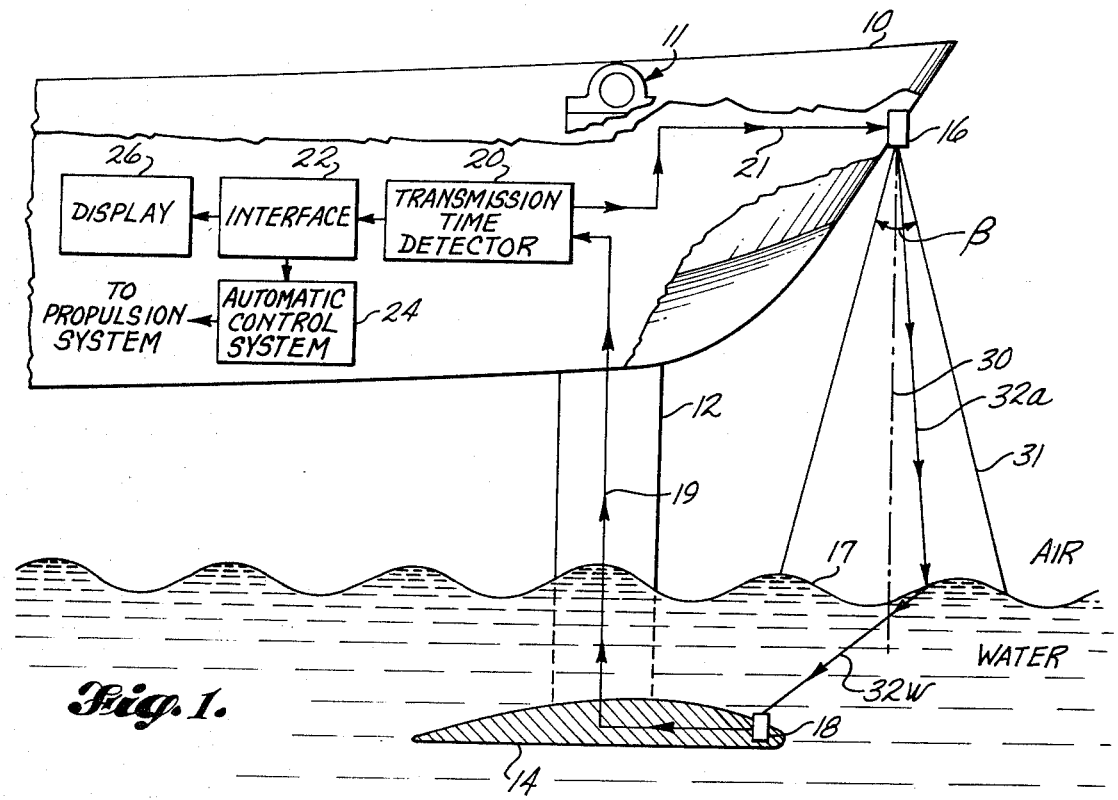
FIG. 1 is a block diagram illustrating the method and the apparatus of this invention.

With reference to FIG. 1, a hydrofoil watercraft includes a hull 10 and first and second struts 11, 12 which are affixed at one end thereof to hull 10 and which support at the other end thereof a hydrofoil 14. By means not shown, hydrofoil 14 is rotatable on struts 11 and 12 to vary the angle of attack thereof relative to the watercraft's direction of travel. The hydrofoil watercraft illustrated in FIG. 1 is designed for operation in rough water, such as is encountered in the ocean, and thus hydrofoil 14 is intended to be totally submerged during craft operation.

To maintain the hull 10 a predetermined distance above the water surface 17, or the hydrofoil 14 a predetermined depth therebelow, this invention uses an ultrasonic transmitter 16 disposed on the hull 10 and an ultrasonic receiver 18 disposed on the craft below the water line, preferably on hydrofoil 14. The transmitter 18 may include a source of ultrasonic energy whose output comprises a continuous waveform or a series of pulses, depending on the particular processing circuitry used to detect the signal transmission time between the transmitter 16 and the receiver 18. Also included in transmitter 16 is an ultrasonic transducer for producing an ultrasonic signal in the air surrounding hull 10. This transducer is connected to a source of electrical energy within transmitter 16 and may comprise a ceramic transducer, a piezoelectric crystal, or the like which converts the electrical energy into an ultrasonic signal suitable for transmission through the air medium. As will be discussed in more detail hereinafter, this transducer should transmit the ultrasonic signal uniformly throughout a predetermined beam so as to assist in reliable operation of the sensor for various slopes of the water.

The ultrasonic signal produced by transmitter 16 is directed at the water surface 17. For example, the signal may travel along the path indicated by ray 32a to surface 17, and thence along the path indicated by ray 32w to receiver 18. Included in receiver 18 is a means for detecting the presence of the ultrasonic signal and producing an electrical signal therefrom. If a continuous wave processing is used, the frequency and phase of the electrical signal is proportional to that of the ultrasonic signal. If a pulsed processing is used, the electrical signal need indicate only the reception of the ultrasonic signal. Receiver 18 may thus comprise any underwater microphone, such as that known as a hydrophone.

The electrical signal from receiver 18 is transmitted by a lead 19 to a transmission time detector 20 which also supplies an energizing signal to transmitter 16 by a lead 21. The function of detector 20 is to determine the elapsed time of transmission of the ultrasonic signal from the transmitter 16 to the receiver 18. As will be noted shortly, this elapsed time is dependent on the position of the water surface 17 with respect to transmitter 16 and receiver 18. Since the distance between transmitter 16 and receiver 18 is always fixed, this transmission time can be thereby related to position of the water surface 17 with respect to either the hydrofoil 14 or hull 10.

In turn, transmission time detector 20 supplies an output signal to an interface circuit 22 which in turn supplies output signals to an automatic control system 24 and to a display means 26. The automatic control system 24 may be any of those commonly known which operate on an input signal corresponding to hydrofoil depth to provide appropriate control signals to the propulsion and hydrofoil angle control systems of the watercraft. The display 26 may comprise an x-y recorder plotting hydrofoil depth or hull height against time, an instantaneous display including a cathode ray tube having both the instantaneous height and an average height symbol displayed thereon, or the like.

Elements 20–26 have been used in previous depth sensors and hydrofoil control systems and therefore individually form no part of this invention. Although an illustrative embodiment of the transmission time detector 20 will be discussed later with reference to FIG. 5, that embodiment is for purposes of explanation only and is not to be construed as a limitation upon this invention.

Rather, this invention rests upon the discovery that the time of transmission of an ultrasonic signal along both an air path and a water path can be reliably and consistently determined for varying configurations of the water surface. As has been already discussed, the previous sonar methods and apparatus detected the transmission time of an ultrasonic signal to and from the water surface, using either air paths or water paths. In this mode of operation, since the ultrasonic signal must be reflected from the surface, the characteristics and configurations of that surface make for intermittent operation of the sensor. Since the present invention does not depend on signal reflection, the surface configuration becomes of much lesser importance and reliable, consistent operation is assured.

The location of the surface 17 can be determined from a measurement of transmission time because the speed of the ultrasonic signal in air and in water differ by a ratio of approximately 1:4. Since the velocity of sound in air and the velocity of sound in water are known, a simple relation can be derived which relates transmission time to hull height or foil depth. Specifically, $$t = (x/c) + x'/c' \quad (1)$$

where
- $t$ = the transmission time of the ultrasonic signal from transmitter 16 to receiver 18, in seconds;
- $x$ = the distance that the ultrasonic signal travels along the air path, in feet;
- $c$ = the velocity of sound in air, in feet/second;
- $x'$ = the distance that the ultrasonic signal travels along the water path, in feet; and
- $c'$ = the velocity of sound in water, in feet/second.

The velocity of sound in air $c$ is approximately 1,100 feet per second, and the velocity $c'$ in water is about 4,800 feet per second. Assuming that the total path length $x + x'$ is 20 feet, relation (1) may be written as follows:

$$t = (x/1100) + (20-x/4800) \quad (2)$$

For an air path distance $x$ of 16 feet, the transmission time $t$ may be calculated to be 0.01469 second. Further calculations indicate that this transmission time would change with hull height or foil depth at the rate of 0.00089 second/foot. As can be seen, the transmission time $t$ may thus be directly related to either the hull height or foil depth.

The output signal from transmission time detector 20 may correspond to measured signal transmission time, to calculated hull height, or to calculated foil depth. In the latter cases, detector 20 may include circuitry which converts the measured transmission times into the height or depth reading according to the above-mentioned relation. This conversion may proceed by either calculation on a continuous basis, or by comparison of the measured transmission times with a precalculated table. Alternately, if the output from detector 20 simply corresponds to transmission time, similar conversion circuitry may be provided in control system 24 or display 26.

The frequency of the ultrasonic energy source within transmitter 16 is not material to a consideration of the method of measurement of the relative position of the water surface 17, for the velocities of sound through air and through water are relatively constant with respect to frequency. However, to obtain the necessary resolution between small differences in transmission time, and thus to accurately determine hull height or foil depth, the frequency of the ultrasonic energy source must be considered in conjunction with the particular processing technique used within transmission time detector 20. It has been found that for continuous wave processing techniques, a frequency of 40 KHz is preferable while for pulsed processing techniques, a frequency greater than 16 KHz is preferable. If continuous wave processing is used with an ultrasonic signal of 40 KHz, if the distance $x + x' = 20$ feet, and if the transmission time detector 20 is accurate to 1 percent, the resolution of position changes is 2 inches.

The prime advantage of the invention is in consistent and reliable operation during most anticipated water surface configurations without the necessity for a large amount of ultrasonic energy supplied by the transmitter 16. This advantage can perhaps best be understood by comparing the propagation loss of an ultrasonic signal through an air-water surface-air, transmission path, as with the sonar systems, with the propagation loss of an ultrasonic signal through an air-water surface-water, transmission path, as with this invention.

The propagation loss of the ultrasonic signal along the transmission path of this invention consists of a loss due to spreading, a loss due to attenuation, and a loss due to transmission through the water surface.

The spreading loss occurs for both the air and the water transmission paths and results from the fact that all rays of the beam in both mediums do not travel in parallel. A defined, parallel beam emitted by transmitter 16 would eliminate the spreading loss in the air medium. However, such a beam could not provide reliable operation of the sensor during all water surface configurations. As will be explained in greater detail, it is desirable to have some spreading of the beam through an angle $\beta$ to insure transmission of a portion thereof through the water to receiver 18.

According to a well-known formula, the spreading loss may be defined in terms of the path distances $x$ and $x'$ as follows:

$$SL = 20 \log (x + x')/(3) \quad (3)$$

where
- $SL$ = spreading loss, expressed in db, or decibels. In this relation, spreading loss is referenced to a sound level measured one yard from the source.

The attenuation loss is determined by multiplying an attenuation constant, $\alpha$ or $\alpha'$, by the path distance $x$ or $x'$. The attenuation constant for air, $\alpha$, is dependent on ambient temperature, relative humidity, and frequency of the ultrasonic signal. For a frequency of 40 KHz, at 15° C. ambient temperature and 80 percent relative humidity, $\alpha = 0.1$ db/ft. For expected water conditions, the attenuation constant for water, $\alpha'$, = 0.00033 db/ft., which is insignificant for the short distance $x'$ contemplated.

The transmission loss through the water surface, or L is also expressed in db as the following:

$$L = 20 \log [P_t P_i] \quad (4)$$

where $P_t/P_i = [2(PC)_2 \sin \theta_1]/[(PC)_2 \sin \theta_1 + (PC)_1 \sin \theta_2]$ (5)
- $P_t$ is transmitted pressure (in water);
- $P_i$ is incident pressure (in air);
- $(PC)_1$ is acoustic impedance of first medium (air);
- $(PC)_2$ is acoustic impedance of second medium (water);
- $\theta_1$ is complement angle of ray path angle of incidence in first medium (air)
- $\theta_2$ is complement angle of ray path angle of incidence in second medium (water).

In simple terms, the transmission loss is expressed as the ratio of the sound pressure levels of the ultrasonic signal in water and in air. It should be cautioned that relation (5) is valid only for planar interfaces, that is, for a smooth water surface. The value of the loss varies from this ratio with anomalies in that interface.

Since the acoustic impedance of water is much higher than that of air, that is, $(PC)_2 = 155{,}000 \text{ g/s/cm}^2$ and $(PC)_1 = 41.4 \text{ g/s/cm}^2$, relation (5) may be reduced to the following:

$$P_t/P_i = [2(PC)_2 \sin\theta_1]/[(PC)_2 \sin\theta_1] = 2 \quad (6)$$

Therefore, from Equation (4)

$$L = -20 \log 2 = -6 \text{ db}$$

Therefore, because of the widely differing acoustic impedances of the water and air mediums, there is actually a gain of approximately 6 db in the transmission of the ultrasonic signal through the water surface.

If the total signal transmission path is again assumed to be 20 feet, and if the length of the water transmission path $x'$ is assumed to be 4 feet, then the various components of the propagation loss, or S, may be written as follows:

$$S = 20 \log[(16+4)/(3)] + (0.1)16 + 0 - 6$$

$$= 16.5 + 1.6 + 0 - 6 = 12.1 \text{ db} \quad (7)$$

The propagation loss for an air-water surface-air sensor, considering no reflection loss, may be calculated as follows:

$$S = 20 \log[(16+16)/(3)] + (0.1)(16+16) = 0$$

$$+ 20.6 + 3.2 + 0 = 23.8 \text{ db} \quad (8)$$

As can be seen, the propagation loss for the latter system is about 12 db greater than the propagation loss for this invention. This difference indicates that a lower power level may be utilized to produce the ultrasonic signal emitted by transmitter 16.

For a rough water surface, the 6 db gain in sound pressure level through the air-water interface is somewhat reduced. However, due to the complex nature of the surface under rough water conditions, the sonar or air path systems have, in addition to the propagation loss noted in relation (8), an additional reflection loss due to dispersion of the transmitted ultrasonic signal in directions other than back to the air-located receiver for such systems. Although the amount of these reflection losses cannot be accurately ascertained, the effects thereof are quite noticeable in rough water, as the operation of the sensor becomes unreliable and inconsistent, no matter what the power level of the ultrasonic energy supplied by transmitter 16. By depending for its operation upon transmission of the ultrasonic signal through the water surface 17, this invention is unaffected by reflection losses and therefore able to provide continuous, consistent, and reliable sensor readings.

To ensure accurate and reliable operation during all expected ocean wave conditions, the ultrasonic signal emitted by transmitter 16 should have a predetermined beam spread.

Typically, the waves in the ocean have a wavelength to height ratio of 7. With such waves, the slope of the surface thereof with respect to the horizontal is approximately 16°. The characteristics of the transmission path through the air and the water mediums can thus best be described in terms of three water surface conditions: an in-coming wave of 16° slope, the peak or trough of a wave, and an out-going wave of 16° slope. These three situations are illustrated, respectively, in FIGS. 2–4.

Figure 2:
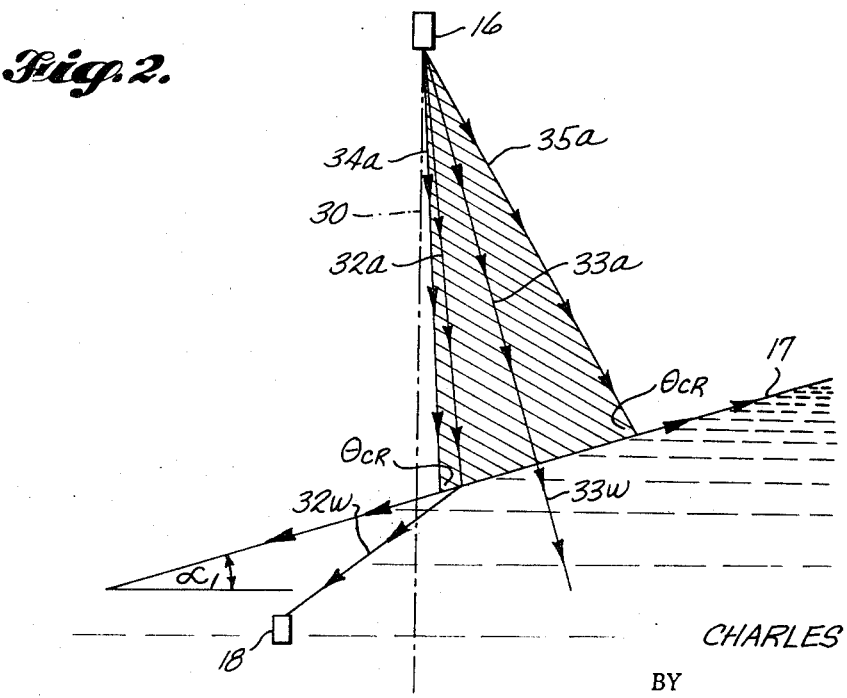
FIGS. 2, 3 and 4 are combined wave and pictorial diagrams showing the various transmission paths of the ultrasonic signal for differing wave slopes.

In FIG. 2, the in-coming wave 17 has a slope which corresponds to an angle $\alpha_1 = 16°$ with respect to the horizontal. It is assumed that the beam from transmitter 16 is directed downwardly and vertically and that the axis thereof extends along a line 30 which is, of course, inclined at right angles with respect to the horizontal.

Under these conditions, not all of the beam which is radiated by transmitter 16 is transmitted through the water surface 17. This phenomenon is due to the fact that a large portion of the beam which travels through the air medium is totally reflected at the surface instead of being refracted and transmitted into the water medium.

The paths of the ultrasonic signals through the air and water mediums may be determined from a consideration of the cosine form of Snell's law:

$$c/c' = \cos\theta/\cos\theta' \quad (9)$$

where:
- $c$ = the velocity of the ultrasonic signal in the air medium,
- $\theta$ = angle of incidence of ultrasonic signal,
- $\theta'$ = angle of refraction of ultrasonic signal, and
- $c'$ = the velocity of the ultrasonic signal in the water medium.

For the sound velocities previously discussed, a critical angle ($\theta_{cr}$) exists beyond which ultrasonic signals travelling through air and impinging on the water surface 17 are totally reflected. For an air and water path, the critical angle $\theta_{cr}$ is 76.75°.

With particular reference again to FIG. 2, the ultrasonic signal paths are shown schematically for in-coming wave 17. A first ray 33a of the beam is normal to the surface 17 and passes through with no change in direction as ray 33w. Rays 34a and 35a, respectively, intersect the surface 17 at the critical angle $\theta_{cr}$ of 76.75° and therefore are totally refracted along the water surface 17. Rays intermediate 34a and 35a, such as ray 32a and ray 33a, comprise the only portion of the beam from transmitter 16 that passes through the water surface 17, the remainder being totally reflected therefrom.

In the example shown, the entire water medium is filled with the refracted rays that pass through the surface 17 and a portion of these rays, represented by ray 32w, reach receiver 18 to ensure a continuous transmission path for the ultrasonic signal.

Figure 3:
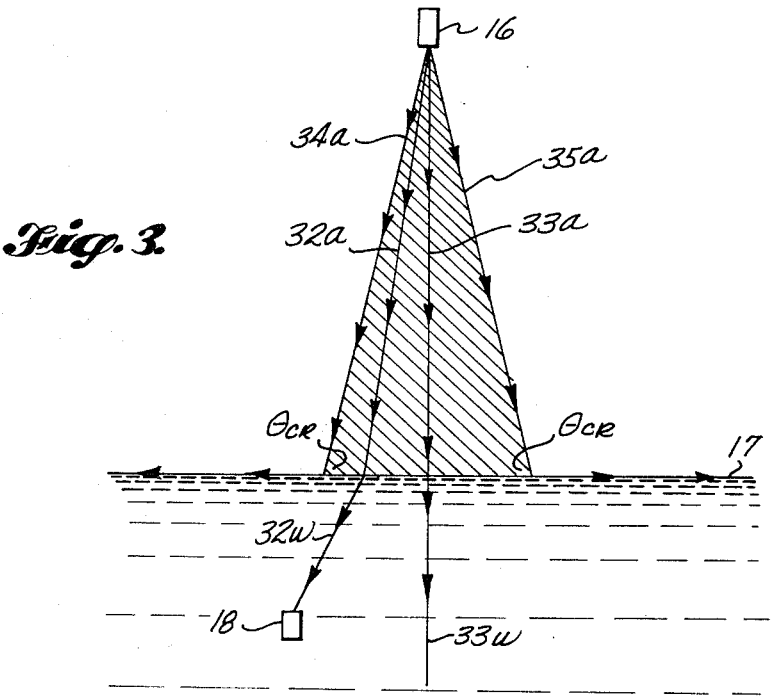
Figure 4:
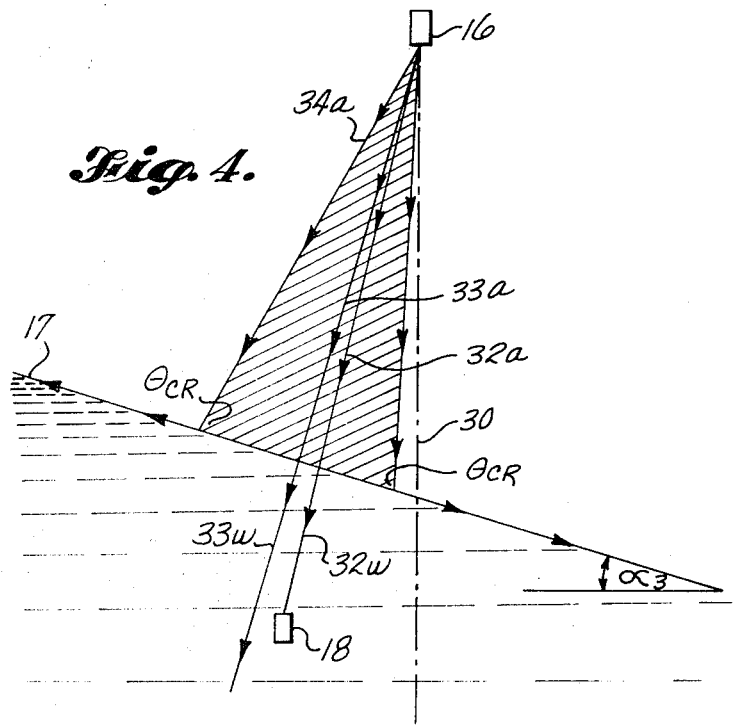

FIGS. 3 and 4, respectively, illustrate the ultrasonic signal paths for level and for out-going waves having a pitch $\alpha_3 = 16°$. It will be noted that in each case only a portion of the beam from transmitter 16 is refracted through the water surface 17, but in each case a continuous transmission path is maintained between transmitter 16 and receiver 18.

The minimum beam pattern angle $\beta$ required to completely ensonify the water medium for waves varying from 16° in-coming to 16° out-going pitch can be calculated as follows. Since axis 30 extends vertically and since the angle $\alpha_1$ is measured with respect to the horizontal, the angle between axis 30 and ray 33a in FIG. 2 is $\alpha_1$. Likewise, the angle between ray 33a and axis 30 in FIG. 4 is equal to $\alpha_3$. Since ray 33a is normal to surface 17, the angle between ray 33a and 35a in FIG. 2 is equal to $(90° - \theta_{cr})$. Then, the minimum beam pattern angle $\beta$ from ray 35a in FIG. 2 to ray 34a in FIG. 4 can be expressed as follows:

$$\beta = 2[\alpha + (90° - \theta_{cr})] \qquad (10)$$

$$= 2[16° + (90° - 76.75°)]$$

$$= 58.5°$$

Of course, complete ensonification of the underwater area is desirable only when the receiver 18 is physically displaced from the vertical axis 30 of the beam from transmitter 16. If, for example, the transmitter 18 were placed directly on that axis, the minimum beam pattern angle $\beta$ could be considerably less than 58.5°.

It can also be noted from FIGS. 2-4 that although the three water surfaces 17 therein may be of equal height with respect to the foil 14 or the hull 10, the transmission time for the ultrasonic signal between transmitter 16 and receiver 18 varies because of the differing signal paths during these three water conditions. That is, both the total signal path and the individual signal paths vary in length, depending on the effective portion of the beam from transmitter 16 and the location on the surface 17 of the region of transmission therethrough. Although these variations would normally cause errors in the detection of either hull height or foil depth, they can be compensated for by appropriate circuitry either within transmission time detector 20, display 26, or the automatic control system 24. This circuitry could, for example, comprise averaging means which integrates the transmission times obtained over a relatively short period, or a slope detecting means which indicates whether or not an in-coming or an out-going wave is being monitored.

Any method and apparatus for sensing the transmission time of the ultrasonic signal from transmitter 16 to receiver 18 that provides desired resolution of height or depth changes can be used with this invention. Two common methods are those utilizing a continuous wave signal or a pulsed signal. With the former, an ultrasonic signal of a given frequency is transmitted by transmitter 16. The transmission time is measured by comparing the phase of the ultrasonic signal received by receiver 18 with the phase of the transmitted ultrasonic signal. The advantage of this method lies primarily in the capability to provide a continuous monitoring of height or depth changes with no steps in system response. The latter method directly measures the period or time between pulse transmission and pulse reception and is particularly advantageous in requiring lower power levels than the continuous wave method.

One apparatus using the continuous wave technique is that known as a sing-around circuit. An embodiment of such a circuit is illustrated in FIG. 5. A blocking oscillator 40 is controlled to provide an ultrasonic output of a given frequency, say, 40 KHz. This output is applied through a power amplifier 42 to transmitter 16 and is radiated therefrom as the ultrasonic signal. The received ultrasonic signal at receiver 18 is fed through an amplifier 44 to the input of a gated amplifier 46. The output of blocking oscillator 40 is also applied to a frequency divider 48 whose output is fed back to the control input of oscillator 40 through gated amplifier 46.

In operation, the gain of the feedback loop including frequency divider 48 and gated amplifier 46 is adjusted in response to the difference in phase between the transmitted and received ultrasonic signals. Adjustment of the gain in this manner proportionately varies the frequency of blocking oscillator 40.

Another output of frequency divider 48 provides pulses whose repetition rate is proportional to the frequency of blocking oscillator 40. These pulses are applied through an amplifier 50 and a frequency doubler 52 to the input of a discriminator 54. As the pulses applied to discriminator 54 are proportional to transmission time, discriminator 54 converts them into an output signal of a desired type which is likewise proportional to transmission time. These output signals are applied to the automatic control system 24 and to the display means 26.

While this invention has been described in terms of specific embodiments of the system elements, it is to be clearly understood by those skilled in the art that the invention is not limited thereto. Rather, the technique for sensing either hull height or foil depth has broad applicability to devices which sense the level of a gaseous-liquid interface relative to a fixed datum point.

I claim:

1. A method for detecting the relative position of an interface between a gaseous medium and a liquid medium, including the steps of:
   a. producing an ultrasonic signal at a first point in the gaseous medium,
   b. receiving, at a second point in the liquid medium, the portion of said ultrasonic signal that is transmitted through said gaseous medium, refracted by said interface, and transmitted through said liquid medium, and
   c. measuring the time of transmission of said ultrasonic signal between said first and said second points.

2. The method as recited in claim 1 wherein said ultrasonic signal comprises a continuous wave, and said step of transmission time measurement includes comparing the phase of said received ultrasonic signal with that of said transmitted ultrasonic signal.

3. A method as recited in claim 1 wherein said ultrasonic signal comprises a series of pulses, and said step of transmission time measurement includes comparing the time occurrences of said transmitted and said received pulses.

4. A sensor for use with a watercraft which detects the position of a supporting water surface relative thereto, comprising:
   a. transmitting means located in the air on the watercraft which directs an ultrasonic signal at the water surface,
   b. receiving means located below the water surface on the watercraft for receiving a portion of said ultrasonic signal which is transmitted through and refracted by said water surface, and
   c. means detecting the time of transmission of said ultrasonic signal from said transmitting means to said receiving means.

5. A sensor as recited in claim 4 for use with a hydrofoil watercraft including a hull, a hydrofoil, and means supporting the hydrofoil from the hull, wherein said transmitting means is located on the hull and said receiving means on the hydrofoil, and wherein said transmission time detecting means provides an output signal corresponding to hull height or hydrofoil depth of submergence.

6. A sensor as recited in claim 4 wherein said ultrasonic signal is directed at the water surface in a vertically extending beam of a minimum beam pattern angle.

7. A sensor as recited in claim 6 wherein said receiving means is offset with respect to a vertically extending axis of said ultrasonic signal beam and wherein said minimum beam pattern angle equals 58.5°.

8. In combination with a sensor as recited in claim 5, an automatic control system coupled to said output signal from said transmission time detecting means and controlling the height of the hydrofoil watercraft in response thereto.

9. In combination with a sensor as recited in claim 5, a display means coupled to said output signal from said transmission time detecting means which provides a visual indication of hull height or hydrofoil depth in response thereto.

* * * * *